United States Patent

[11] 3,556,117

| [72] | Inventor | Jay R. Katchka<br>Long Beach, Calif. |
|---|---|---|
| [21] | Appl. No. | 644,343 |
| [22] | Filed | June 7, 1967 |
| [45] | Patented | Jan. 19, 1971 |
| [73] | Assignee | Robertshaw Controls Company<br>Richmond, Va.<br>a corporation of Delaware |

[54] UNITARY PRESSURE REGULATOR AND FLOW CONTROL DEVICE
12 Claims, 4 Drawing Figs.

| [52] | U.S. Cl. | 137/66, |
| | | 137/614.17, 431/54 |
| [51] | Int. Cl. | F23q 9/12 |
| [50] | Field of Search | 137/65, 66, |
| | | 614.17; 431/51, 52, 53, 54, 55, 56 |

[56] References Cited
UNITED STATES PATENTS

| 2,721,570 | 10/1955 | Caperone et al. | 137/66 |
| 2,842,146 | 7/1958 | Schuster | 137/66 |
| 2,850,032 | 9/1958 | Coffey | 137/66 |
| 2,881,779 | 4/1959 | Meusy | 137/66 |
| 2,982,300 | 5/1961 | Jackson et al. | 137/614.17X |
| 3,433,409 | 3/1969 | Jackson et al. | 137/66X |

*Primary Examiner*—Robert G. Nilson
*Attorneys*—Auzville Jackson, Jr., Robert L. Marben and Christen, Sabol, O'Brien & Caldwell ABSTRACT: A fluid flow control device having a manually operated valve, a manually resettable automatic safety valve means upstream of the manually operated valve, and pressure regulating means utilizing the same valve member as the safety valve means. The pressure regulating means includes a regulating chamber and diaphragm in the manually operated valve means and a balancing chamber and diaphragm in the safety valve means.

INVENTOR.
JAY R. KATCHKA
BY
Christen, Sabol, O'Brien & Caldwell
ATTORNEY

INVENTOR.
JAY R. KATCHKA
BY
Christen, Sabol, O'Brien + Caldwell
ATTORNEY

UNITARY PRESSURE REGULATOR AND FLOW CONTROL DEVICE

The present invention relates to fluid flow control devices and, in particular to such a control device having manual valve means, automatic safety valve means and pressure regulating means arranged in a unitary assembly.

It is conventional practice in the art to control a fluid flow and regulate the pressure of such flow as when the fluid flow is fuel gas that is required to be supplied to gas burner apparatus at a predetermined pressure in accordance with the capacity of such burner apparatus. In addition to pressure regulation, the fluid flow is controlled by manually operated valve means and by automatic safety valve means. However, the known prior art devices require complicated arrangements for the plurality of control components, which are expensive to manufacture, install and service.

It is, therefore, an object of the present invention to combine the flow control and pressure regulation components of a burner control system into a unitary control device.

The present invention has another object in that a single valve member is utilized for pressure regulation and safety shutoff in a flow control device.

Another object of the present invention is to balance the regulatory movement of a pressure regulator against inlet pressure variations in a flow control device.

It is another object of this invention to provide the automatic safety means in a flow control device with a pressure balancing chamber for the pressure regulator of such device.

This invention has another object in that a flow control device having a pressure regulator and a safety shutoff device is provided with a combined regulator adjustment means and reset means for the shutoff device.

A further object of the present invention is to combine a pressure regulator and a safety device reset means in the manually operated valve means of a flow control device.

In accordance with the present invention, a flow control device includes a casing having inlet and outlet means with flow passage means therebetween, manually operable valving means movably disposed in the flow passage means for movement between a plurality of controlling positions to control a fluid flow therethrough, valve means disposed upstream of the manually operable valving means, pressure regulating means operatively connected to the valve means to impart a regulatory movement thereto, and safety shutoff means disposed adjacent the valve means and being movable to close the same.

Other objects and advantages of the present invention will become apparent from the following description of a preferred embodiment taken in conjunction with the accompanying drawings wherein.

Figure 1:
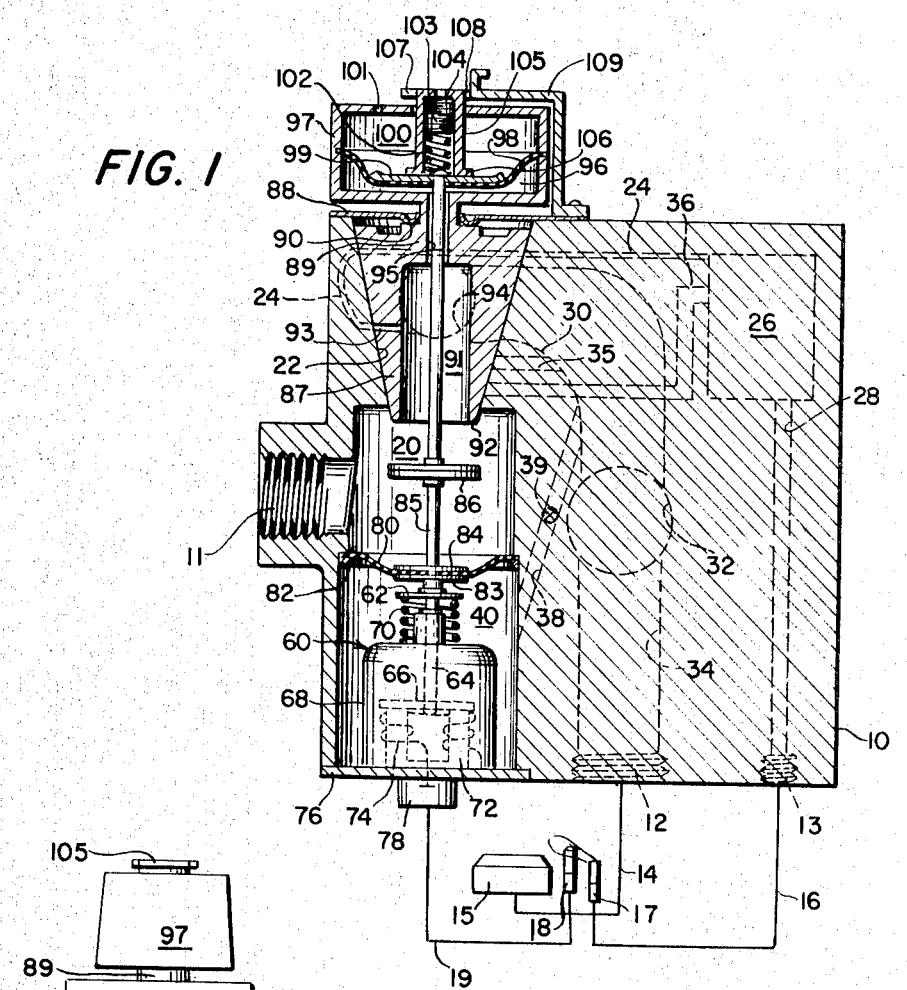
FIG. 1 is a schematic diagram of a burner control system with a cross-sectional view of a control device embodying this invention.

As is illustrated in FIG. 1, the present invention is embodied in the casing 10 of a thermostatic control device having an inlet 11 adapted to be connected to a source of fuel, such as a gas supply (not shown), main outlet 12 and a pilot outlet 13. The main outlet 12 is connected by piping 14 to a main burner 15 and the pilot outlet 13 is connected by piping 16 to a pilot burner 17 which is disposed in igniting proximity to the main burner 15. A flame sensor in the form of a thermocouple 18 is disposed in the flame of the pilot burner 17 and is electrically connected to an electromagnetic safety device by means of a thermocouple cable 19.

The casing 10 is hollowed out to define an inlet chamber 20 communicating with the inlet 11 and with a truncated conical bore 22. A pilot passage 24 has one end opening into the bore 22 intermediate its ends and another end opening into a filter cavity 26 that has an outlet opening communicating with a pilot passage 28 leading to the pilot outlet 13. A main passage 30 has one end opening into the bore 22 in radially spaced relation to the opening of the bypass pilot passage 24 and another end communicating with a main valve seat 32 which leads to a downstream passage 34 communicating with the main outlet 12. A second pilot passage flow path includes two portions 35 and 36 having adjacent ends opening into the bore 22; the other end of portion 35 extends from the main passage 30 while the other end of portion 36 leads to filter cavity 26 to provide a separate pilot flow to the pilot outlet 13 when the first pilot passage 24 is closed. A pressure sensing passage 38 has one opening communicating with the main passage 30 upstream of the main valve seat 32 and an opposite opening communicating with a balancing chamber 40 in which the electromagnetic safety device is mounted.

Figure 2:
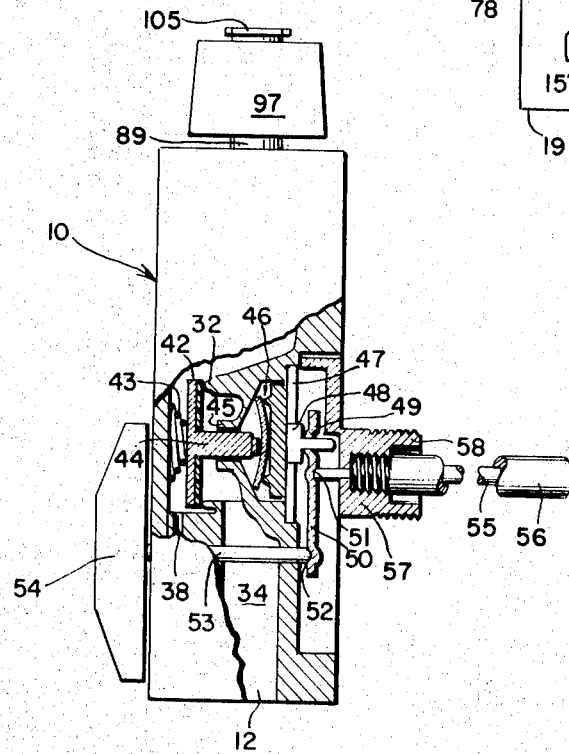
FIG. 2 is a side elevation view of the control device of FIG. 1 with parts broken away and parts in section.

As is illustrated in FIG. 2, the main flow of fuel past the main valve seat 32 is thermostatically controlled by a valve disc 42 which is biased toward the seat 32 by means of a coil spring 43 mounted in compression between the nonseating surface of disc 42 and an internal wall of the casing 10. A valve stem 44 extending from the valve disc 42 slidably extends through a guide bushing 45 formed in a rear wall of casing 10 to project into engagement with actuating means 46. The actuating means 46 is a conventional snap acting mechanism in which a clicker disc moves from an inoperative or valve-closed position to an operative or valve open position through an over center position with a snap action in response to an operating force applied to a round plate having an annular fulcrum in engagement with the clicker disc. The snap acting actuator means 46 is sealed and retained in an exterior recess formed in the rear wall of casing 10 by means of a sealing washer 47 which is press fitted into such exterior recess. The operating force is applied to the disc and plate by means of an operating button 48.

The operating button 48 abuts a suitable projection 49 formed adjacent one end of an operating lever 50 which has an intermediate recess 51 receiving the rod end of a rod and tube thermostat assembly; another recess 52 formed adjacent the other end of lever 50 receives the end of an adjusting shaft 53. The adjusting shaft 53 is axially movable in a sleeve (not shown) which extends across the downstream passage 34; the opposite end of shaft 53 abuts an adjusting screw (not shown) which is threaded through the front wall of casing 10 and which carries a temperature selection knob 54 on its external end. With such an arrangement it is apparent that rotation of the temperature selection knob 54 through a selective range of temperature settings will change the relative position of the operating lever 50 whereby the temperature at which the thermostat effects actuating of the snap acting mechanism 46, will be determined by the preset position of the lever 50.

The thermostat for actuating the lever 50 is a conventional rod and tube type in which a rod 55 of a relatively low coefficient of thermal linear expansion material is concentrically disposed in a tube 56 of a relatively high coefficient of thermal linear expansion material. The free ends of the rod 55 and tube 56 are joined as by welding; the mounting end of tube 56 is secured as by threads to a mounting shank 57 that is attached to the rear wall of casing 10 by means of flanges and threaded bolts (not shown). The end of the mounting shank 57 includes external threads 58 for threadedly attaching the control device through a wall whereby the rod and tube thermostat may be disposed to respond to the temperature of the medium heated by the main burner 15.

The mechanisms described in connection with elements 45—58 inclusive are conventional in the art as exemplified by U.S. Pat. No. 2,953,937, and it is to be understood that other suitable arrangements may be utilized for thermostatically controlling the main flow of fuel past the main valve seat 32 in accordance with variations from a preset desired temperature condition.

The electromagnetic safety device, indicated generally at 60 in the balancing pressure chamber 40, includes an annular plate 62 secured to one end of an armature stem 64 which slidably extends through a guide and bushing so that an armature 66 on the other end of stem 64 is disposed in a magnet housing 68. A coil spring 70 surrounds one end of the stem 64 and is mounted in compression between the plate 62 and the exterior of the magnet housing 68 whereby the armature 66 is normally biased to a safety or shutoff position. The plate 62, stem 64 and armature 66 reciprocate as a unit between released and attached positions relative to fixed electromagnetic means in the form of a generally U-shaped magnet core 72 and an electric coil 74 wound thereon. The magnet core 72 is secured to the magnet housing 68 by any suitable means such as a unitary closure plate 76 which seals the adjacent end of chamber 40 as by threaded fasteners (not shown) threaded into casing 10. The energizing coil 74 has one end grounded to the magnet housing 68 and its opposite end electrically connected to the thermocouple cable 19 as by a thermocouple cable connecter 78.

The top end of chamber 40, as viewed in FIG. 1, is sealed by a flexible diaphragm 80, the periphery of which is fixed to a wall of casing 10 as by a press fit ring 82. The center portion of the diaphragm 80 is sandwiched between rigid plates 83 and 84 for unitary movement therewith. The diaphragm 80 defines a balancing diaphragm, one side of which is subject to pressure in the chamber 40 and the other side of which is subject to inlet chamber 20. One end of a valve stem 85 is fixed to the diaphragm plates 83—84 and a disc valve member 86 is fixed to the stem 85 intermediate its ends for unitary movement therewith.

A manually operated, truncated conical plug valve 87 is rotatably seated in the conical bore 22 and is resiliently retained therein by means of a spring retainer plate 88 which is secured to the top of casing 10 as by cap screws (not shown). The spring plate 88 substantially covers the wide end of the plug valve 87 and is centrally apertured to receive the stem 89 of the plug valve 87; an annular shoulder 90 surrounding the plug valve stem 89 is resiliently engaged by an annular bead on the plug valve 87 into the conical seat 22. The central portion of the plug valve 87 is hollowed out to define a chamber 91, the ingress to which is controlled by an annular valve seat 92 located on the truncated end of its conical configuration for cooperation with the disc valve member 86. A bypass pilot port 93 transversely extending through a wall of the plug valve 87 establishes communication between the chamber 91 and the bypass pilot passage 24. A main port 94, radially spaced from the bypass pilot port 93, also transversely extends through a wall of the plug valve 87 to establish communication between the chamber 91 and the main passage 30. A peripheral slot 37 in the conical wall of the plug valve 87 completes the communication between adjacent ends of the pilot passage portions 35 and 36; this slot 37 permits a pilot flow through passages 35 and 36 when the main port 94 is brought into registry with the main passage 30.

The plug valve 87 and its stem 89 are centrally bored along their rotary axis to define an axial port 95 which establishes communication between the chamber 91 and a pressure regulating chamber 96 contained in a handle portion or hollow knob 97. The pressure regulating chamber 96 has a movable wall in the form of a flexible diaphragm 98, the periphery of which is transversely fixed to the wall of the hollow knob 97. The central portion of the diaphragm 98 includes a backup plate 99 that is centrally fixed to the end of the valve stem 85 which extends through the plug valve chamber 91 and axial port 95 so that there is unitary movement with the disc valve member 86 and the two diaphragms 80 and 98.

Above the diaphragm 98, the hollow knob 97 has an atmospheric chamber 100 and an aperture 101 for venting the chamber 100 to the atmosphere. The diaphragm 98 is biased by means of a coil spring 102 mounted in compression between the backup plate 99 and an adjustment screw 103. The coil spring 102 partially extends into a threaded bore 104 in which the screw 103 is positioned and which centrally extends into a hollow push button 105. The push button 105 reciprocally slides in a central aperture in the top of plug valve knob 97 but is keyed for unitary rotary movement therewith and has a bottom peripheral flange 106 engaging the backup plate 99 when depressed and engaging the undersurface of the top wall of knob 97 when released to prevent its expulsion therefrom by the coil spring 102. The external portion of push button 105 has a top peripheral flange 107 which has a radial notch 108 (FIG. 1). An interlock device in the form of a inverted L-shaped strip 109 has one end secured to the top of casing 10 as by one of the cap screws fastening the spring cover plate 88; the other end of strip 109 is disposed under the push button flange 107. Thus, the interlock strip 109 prevents the push button 105 from being manually depressed to effect reset (see FIGS. 3 and 4) until the plug valve knob 97 has been moved to a rotary position where the interlock strip 109 is in registry with the notch 108 in the push button flange 107 (FIG. 1). The plug valve knob 97 is provided with suitable position indicating markings (not shown) that may cooperate with the interlock strip 107 as a reference mark to indicate the "off," "pilot" and "on" positions of the plug valve 87.

OPERATION

When the plug valve knob 97 is in its "off" position, the tapered wall of the plug valve 87 closes off the pilot passage 24 and the main passage 30 so there is no fuel flow from the plug valve chamber 91. Furthermore, since there is no flame at the pilot burner 17, the electromagnetic safety device 60 is deenergized and the disc valve 86 is closed on the valve seat 92 by the bias of the coil spring 70.

To initiate operation of the control system, the plug valve know 97 is manually rotated from its "off" position to its "pilot" position whereby the main port 94 and slot 37 are still out of registry with the main passage 30 and pilot passages 35—36, respectively, but the pilot port 93 is in registry with the pilot passage 24. The reset button 105 is now depressed, as is illustrated in FIG. 1, displacing the valve disc 86 from its seat 92 and permitting a pilot flow of fuel which may be traced from inlet 11, through inlet chamber 20, plug valve seat 92, plug valve chamber 91, pilot port 93, pilot passage 24, filter cavity 26, pilot passage 28, pilot outlet 13 and pilot piping 16 to the pilot burner 17 when it is ignited as by a match. As soon as the pilot burner flame sufficiently heats the thermocouple 18, the electromagnetic safety device 60 is energized and the reset button 105 may be released whereupon the abutment elements 62—66 are held in a latched position by the magnetic latching means 72. During the resetting operation, there is no pressure regulation of the pilot flow of fuel because the regulating valve means 86 is held in its maximum open position.

The plug valve knob 97 is now rotated from its "pilot" position to its "on" position whereby a main flow of fuel may be traced from the plug valve chamber 91 through the main port 94, the main passage 30, the main valve seat 32 (if the thermostat 55—56 is calling for heat), the main outlet passage 34, the main outlet 12 and the main piping 14 to the main burner 15 where it is ignited by the flame of the pilot burner 17. The pilot port 93 in the plug valve 87 has an arcuate dimension that is sufficient to maintain registry with the pilot passage 24 until just after the peripheral slot 37 commences registry with the two pilot passages 35 and 36. Thus, during rotation from "pilot" to "on" positions, a pilot flow of fuel to the pilot burner 17 is assured because of the second pilot flow passages 35 and 36 leading from the main passage 30; upon completion of the rotation, the pilot passage 24 is cut off but the pilot flow of fuel is maintained by the second pilot passages 35 and 36. The above arrangement provides for a nonregulated pilot flow of fuel during the resetting operation while the pilot burner 17 is being ignited and provides for a regulated pilot flow of fuel by means of the second pilot passages 35 and 36 when the plug valve 87 is in its "on" position.

Figure 3:
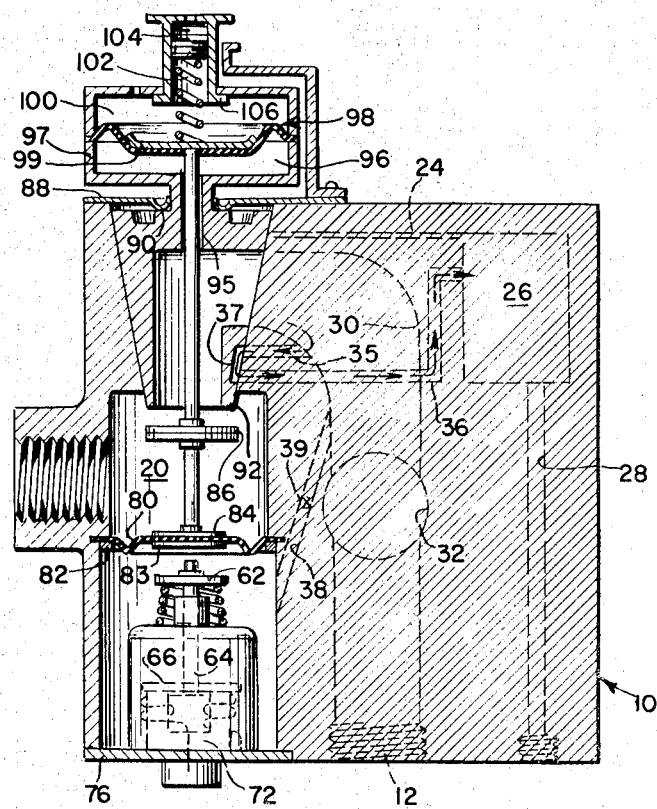
FIG. 3 is a cross section of the control device of FIG. 1 in another controlling position.

In its "on" position, as is illustrated in FIG. 3, a flow from the plug valve chamber 91 also proceeds through the axial port 95 to the pressure regulating chamber 96 whereby a regulating pressure force is exerted on the underside of the regulating diaphragm 98. The regulating diaphragm 98 operates in a conventional manner to impart a regulatory movement to the valve disc 86. In addition, the balancing diaphragm 80 is provided with a pressure balancing force of regulated fuel flow to secure a balance for the pressure differential effect on the regulating valve means. Such balancing force is obtained by a bleed flow of fuel from the main passage 30 through a bleed passage 38 and its restricting orifice 39 into the pressure balancing chamber 40. The restricting orifice 39 acts as a leak limiting device in case of rupture of the balancing diaphragm 80. The bleed passage 38 communicates with the main passage 30 upstream of the main valve seat 32 so that the balancing feature is maintained for regulation of the pilot flow of fuel when the thermostatically operated valve member 42 is closed on the main valve seat 32; furthermore, in case of rupture of the balancing diaphragm 80, the restricted leakage is subject to control by the thermostatically operated valve member 42 so there can be no leakage when the main burner 15 is not operating. During normal operation, the main burner 15 will be cycled thermostatically by on-off movements of the main valve 42 in accordance with the temperature variations sensed by the rod and tube thermostat 55—56.

Figure 4:
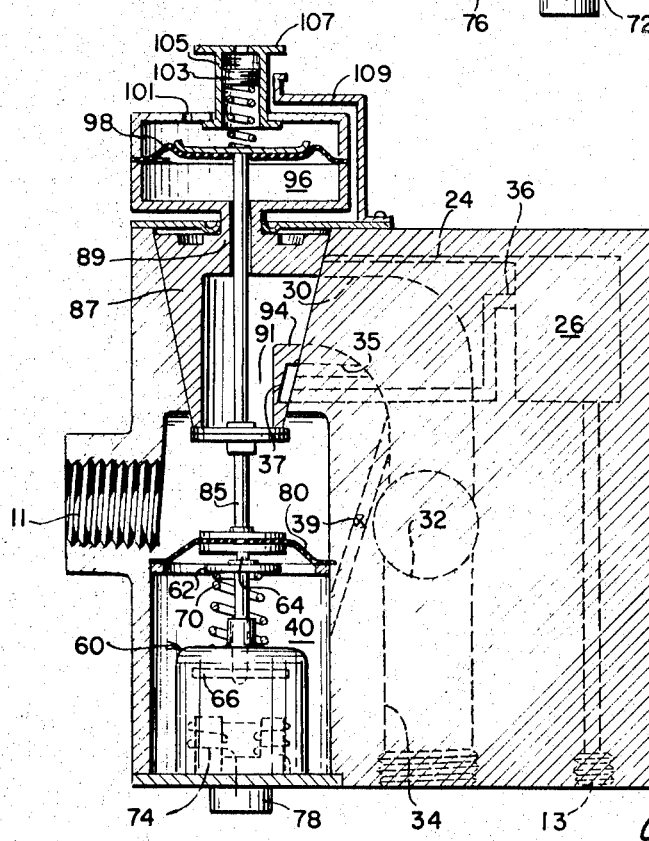
FIG. 4 is a cross section of the control device of FIG. 1 in still another controlling position.

Should the flame at the pilot burner 17 be extinguished from any cause, the thermocouple 18 will cool and the thermoelectric current to the coil 74 will cease; thereupon, the magnetic latch is released and the armature 66 is displaced from the magnet core 72 under the bias of the coil spring 70. As is illustrated in FIG. 4, the coil spring 70 biases the shaft 64 against the plate 83 causing the pressure regulating means to be displaced upward with the regulating valve 86 being closed on the seat 92 to effect 100 percent shutoff of all fuel flow. In order to place the system in operation again, the plug valve knob 97 must be rotated from its "on" position to its "pilot" position and the resetting procedure outlined above must be repeated.

In accordance with the present invention, a single valve means is utilized for both pressure regulation and safety shutdown, and a single diaphragm is utilized for pressure regulation balancing as well as functioning with the safety device on automatic shutdown. It is to be noted that the force exerted by the safety device coil spring 70 is sufficiently great to overcome the opposing force of the regulator spring 102 but is not great enough to overcome the retaining force by the spring plate 88 so there can be no axial displacement of the plug valve 87 as when the regulating valve disc 86 is biased against the valve seat 92. Of course, the valve seat 92 may be formed in the casing itself rather than being on the end of the plug valve 87 to avoid any outward biasing at all on the plug valve 87.

Inasmuch as the preferred embodiment of the present invention is subject to many modifications, variations and changes in details, it is intended that all matter contained in the foregoing description or shown on the accompanying drawings, shall be interpreted as illustrative and not in a limiting sense.

I claim:
1. In a fluid flow control device, the combination comprising:
a casing having inlet and outlet means and flow passage means therebetween, and an inlet chamber adjacent said inlet means;
manually operable valving means movably disposed in said flow passage means for movement between a plurality of controlling positions to control a fluid flow therethrough;
regulating valve means disposed in said inlet chamber and upstream of said manually operable valving means;
pressure regulating means operatively connected to said regulating valve means to impart a regulatory movement thereto;
safety shutoff means disposed adjacent said regulating valve means and being movable from a latched position to a released position for effecting closure of said regulating valve means; and
said pressure regulating means including a regulating diaphragm carried by said manually operable valving means and defining a pressure regulating chamber therein, a stem element fixed to said regulating diaphragm and extending into said inlet chamber for connection to said regulating valve means, means establishing communication between said inlet chamber and said pressure regulating chamber whereby a pressure force is exerted on said regulating diaphragm, and biasing means exerting a biasing force on said regulating diaphragm in opposition to the pressure force.

2. The invention as recited in claim 1 wherein said casing includes a mounting chamber disposed adjacent said inlet chamber and housing said safety shutoff means therein.

3. The invention as recited in claim 2 wherein diaphragm means separates said mounting chamber and said inlet chamber and is operatively connected to said stem, and wherein said safety shutoff means includes latching means and abutment means movable therefrom whereby release of said abutment means from said latching means moves said abutment means into engagement with said diaphragm means for moving said stem and closing said regulating valve means.

4. The invention as recited in claim 3 wherein said diaphragm means includes a flexible member defining a balancing diaphragm and wherein said casing includes a passageway establishing communication between said mounting chamber and said flow passage means downstream of said regulating valve means whereby said mounting chamber is subject to a balancing pressure to exert a balancing force on said valve stem.

5. The invention as recited in claim 3 wherein said manually operable valving means comprises a rotatable plug valve having chamber means communicating with said inlet chamber downstream of said regulating valve means, a main port and a pilot port, wherein said flow passage means includes a main passage adapted for registration with said main port, and wherein said casing includes a pair of pilot flow passageways, one of said pilot flow passageways communicating with said main port and the other adapted for registration with pilot port.

6. The invention as recited in claim 5 wherein thermostatically operated valve means is disposed in said main passage to thermostatically control the fluid flow to said outlet means.

7. The invention as recited in claim 5 wherein said manually operable valving means includes a hollow operating knob for rotating said plug valve; wherein said regulating diaphragm is mounted in said knob; and wherein reset means is carried by said knob and is movable into engagement with said regulating diaphragm; said regulating diaphragm, said stem and said diaphragm means being movable as a unit by said reset means whereby said regulating valve means is moved to an open position and said abutment means is moved to a holding position by said latching means during a resetting operation.

8. The invention as recited in claim 9 wherein said reset means comprises a hollow push button, and wherein said biasing means comprises a coil spring having one end mounted in said hollow push button, and adjusting means in said hollow push button engaging the said one end of said coil spring for adjusting the biasing force on said regulating diaphragm.

9. In a fluid flow control device, the combination comprising:
a casing having inlet and outlet means and flow passage means therebetween;
valving means movably disposed in said flow passage means for movement between a plurality of controlling positions to control a fluid flow therethrough;
a manual control knob connected to said valving means for manually moving the same between its positions;
regulating valve means disposed upstream of said valving means to control the fluid flow into said valving means;

pressure regulating means carried by said manual control knob and being operatively connected to said regulating valve means to impart a regulatory movement thereto; and safety shutoff means disposed adjacent said regulating valve means and being movable from a latched position to a released position for effecting closure of said regulating valve means.

10. The invention as recited in claim 9 wherein stem means connects said safety shutoff means to said regulating valve means and a reset button is manually depressable to engage said pressure regulating means whereby upon depression of said reset button said regulating valve means is moved to an open position and said safety shutoff means is moved from its released position to its latched position.

11. The invention as recited in claim 10 wherein said reset button is carried by said control knob.

12. A fluid flow control device comprising:
a casing having inlet and outlet means;
an inlet chamber in said casing having one end disposed adjacent and in communication with said inlet means;
flow passage means in said casing having an outlet portion communicating with said outlet means and an inlet portion communicating with another end of said inlet chamber;
manually operable valving means disposed in the inlet portion of said flow passage means and being movable between a plurality of controlling positions to control a fluid flow from said inlet chamber to said flow passage means;

regulating valve means operatively disposed upstream of said manually operable valving means and being in said inlet chamber to regulate the fluid flow therefrom;

pressure regulating means carried by said manually operable valving means and being operatively connected to said regulating valve means to impart a regulatory movement thereto;

said pressure regulating means including a pressure responsive diaphragm remotely displaced from said inlet chamber but being positioned so as to respond to pressure of the fluid flow passing through said manually operable valving means;

safety shutoff means in said casing movable between latched and released positions;

operative connection means between safety shutoff means and said regulating valve means causing closure of said regulating valve means when said safety shutoff means is moved from its latched position to its released position; and said operative connection means including diaphragm means defining a movable wall of said inlet chamber to seal said safety shutoff means therefrom.